United States Patent

3,617,109

| [72] | Inventor | Ping K. Tien<br>Chatham Township, N.J. |
| --- | --- | --- |
| [21] | Appl. No. | 860,383 |
| [22] | Filed | Sept. 23, 1969 |
| [45] | Patented | Nov. 2, 1971 |
| [73] | Assignee | Bell Telephone Laboratories, Incorporated<br>Murray Hill, N.J. |

[54] LIGHT GUIDE COUPLING AND SCANNING ARRANGEMENT
14 Claims, 6 Drawing Figs.

| [52] | U.S. Cl. | 350/96 WG, 350/160 |
| --- | --- | --- |
| [51] | Int. Cl. | G02b 5/14 |
| [50] | Field of Search | 350/96 WG, 160, 161 |

[56] References Cited
UNITED STATES PATENTS

| 3,386,787 | 6/1968 | Kaplan | 350/96 WG |
| --- | --- | --- | --- |
| 3,395,366 | 7/1968 | Snitzer et al. | 350/96 WG |
| 3,408,131 | 10/1968 | Kapany | 350/96 WG |
| 3,471,215 | 10/1969 | Snitzer | 350/96 WG |
| 3,489,481 | 1/1970 | Osterberg et al. | 350/96 WG |

Snyder, A. W., Excitation of Waveguide Modes in Retinal Receptors, J.O.S.A., Vol. 56, No. 5, May 1966, pp. 705–706.

Mauer et al., Ray-Optical Techniques for Guided Waves, Proceeding IEEE, Vol. 55, No. 10, Oct. 1967, pp. 1718–1729.

*Primary Examiner*—Ronald L. Wibert
*Assistant Examiner*—J. Rothenberg
*Attorneys*—R. J. Guenther and Arthur J. Torsiglieri

ABSTRACT: There is disclosed an optical guiding apparatus of the type in which a dielectric body is bounded by other dielectric materials or free space and has only one dimension sufficiently small to produce guiding of the light. The apparatus includes means for supplying a coherent light beam in a desired mode or modes to the body and means for receiving one or more light beams from the body. The apparatus is characterized by a taper of the body to vary the one dimension sufficiently to provide light coupling between the body and at least one of the supplying or receiving means at a cutoff line for the guiding action. Electro-optic light deflection is provided within the body in some embodiments. Since different modes can be coupled out at different cutoff lines, this property is used in one embodiment to provide a two-coordinate light deflector which is useful in scanning applications.

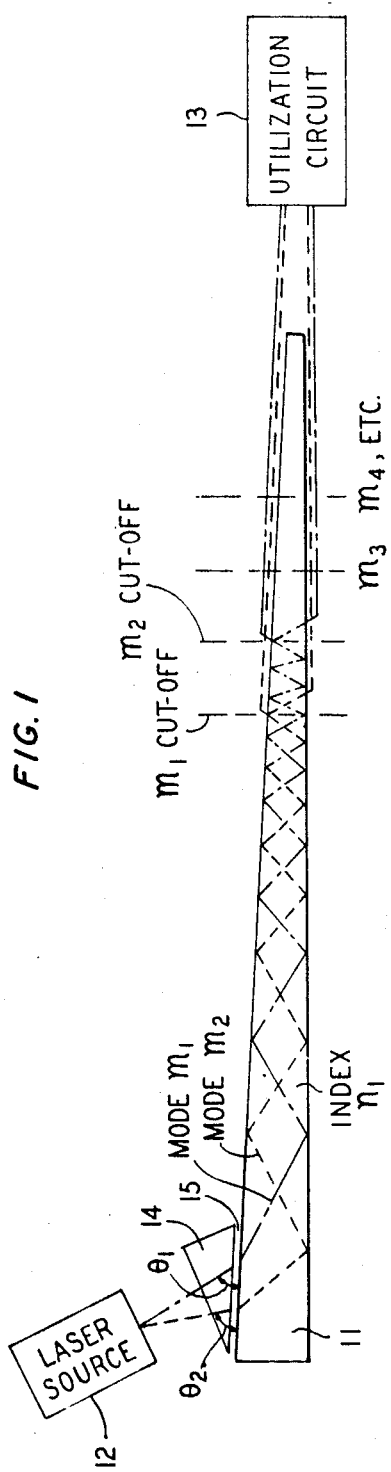
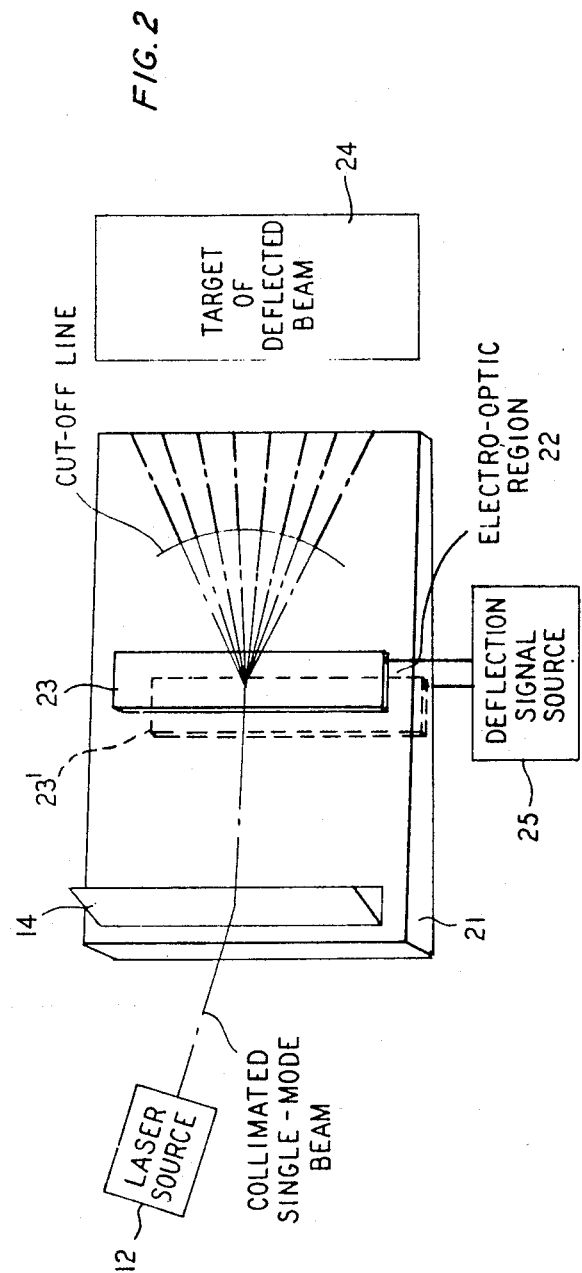
FIG. 1
FIG. 2
INVENTOR
P. K. TIEN
BY Wilford L. Wiener
ATTORNEY

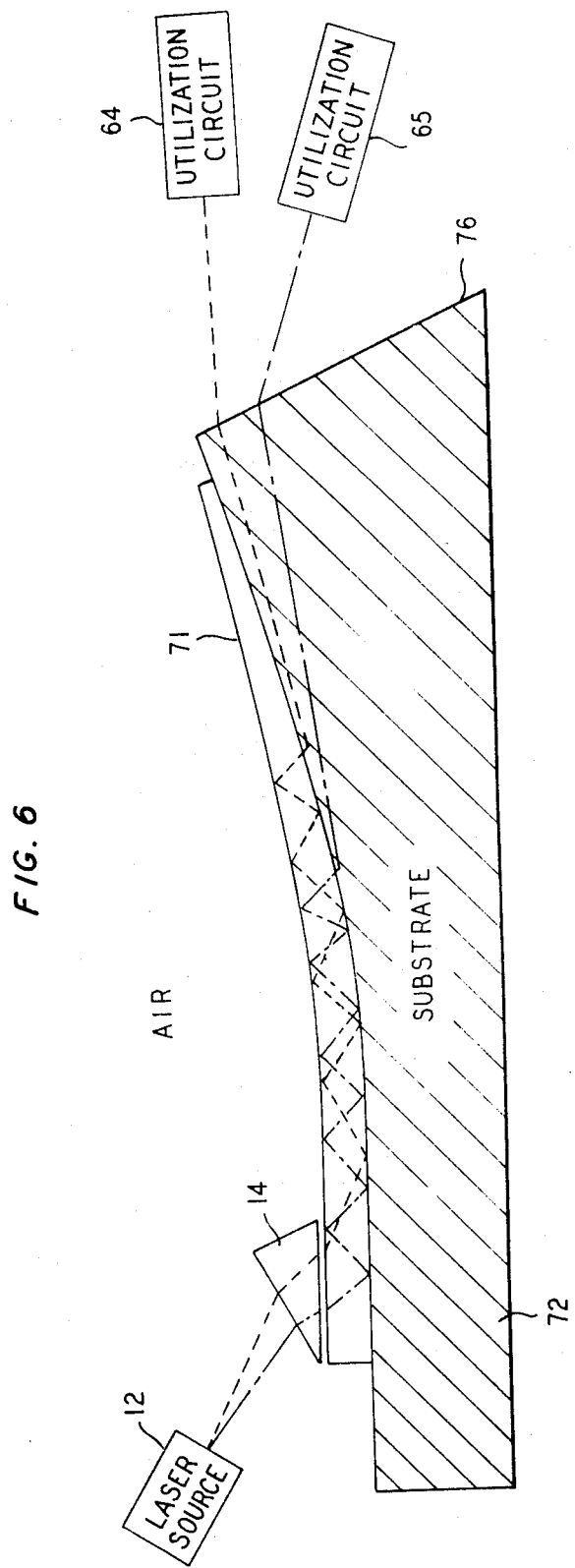

LIGHT GUIDE COUPLING AND SCANNING ARRANGEMENT

BACKGROUND OF THE INVENTION

This invention relates to optical guiding apparatuses in which coupling to associated optical components is provided. Certain aspects of the invention also relate to light beam deflection apparatuses.

In my copending patent application Ser. No. 793,696, filed Jan. 24, H1969, and assigned to the assignee hereof, there is disclosed the technique for coupling a light beam through the relatively smooth or broad surfaces of an optical guiding thin film, wherein the light beam can be carried over significant distances or processed with improved facility. That coupling arrangement employs a relatively high index prism separated from the thin film by a relatively low index dielectric gap. Output coupling from the thin-film device, according to that technique, is provided by an inverse prism-film coupling arrangement, which for some applications may be unduly complicated. For example, if scanning of the light beam is to be accomplished within the thin film, then the spread of the possible locations of the light beam when coupled out of the film may be so great as to make the prism-film coupling arrangement unduly large, difficult to manufacture and install, and costly.

Moreover, it is an implicit assumption of such an arrangement that visible optical wavelengths, for which the thin film is so thin as to require a substrate support, are of primary interest. Nevertheless, in the infrared portion of the spectrum, it is possible to have a platelet guide of one thin dimension which is sufficiently rigid to be self-supporting, in air, vacuum or any other dielectric gaseous environment.

I have recognized that simplified coupling arrangements for thin one-dimension-guiding bodies may be desirable, particularly for self-supporting guides.

SUMMARY OF THE INVENTION

According to my invention, an optical-guiding apparatus of the type in which a dielectric body is bounded by a lower index dielectric medium and has only one dimension sufficiently small to produce guiding of the light is provided with simplified coupling to a source of a coherent light beam or to a receiver or a utilization apparatus for the coherent light beam by being smoothly tapered to cut off in its thin dimension. In the broad sense, this taper is essentially a smooth decrease of the relative propagation constant of the body to a point at which the body will no longer support a discrete mode of the coherent light wave propagating therein, whereupon the light emerges from the body substantially at a grazing angle thereto.

In the preferred embodiments of my invention, this technique is employed for providing output coupling of the light from the body to an optical receiving or utilization apparatus. Input coupling may still be provided by a prism-film coupling arrangement.

Advantageously, light deflection may be provided in the body without in any way complicating the coupling of the light from the body since the cutoff properties extend in at least one dimension along a cutoff line. No bulky coupling prism is needed to extract the deflected output beam.

According to another feature of my invention, since different modes are coupled from the body at different cutoff lines, this property is utilized to provide deflection of the output light beam throughout a two-coordinate target array.

According to other features of my invention, thin-film guides that are both curved and tapered along the light beam paths can provide angular separation of the output modes.

BRIEF DESCRIPTION OF THE DRAWING

Further features and advantages of my invention will become apparent from the following detailed description, taken together with the drawing, in which:

FIG. 1 is a partially pictorial and partially block diagrammatic illustration of a basic embodiment of my invention;

FIG. 2 is a partially pictorial and partially block diagrammatic illustration of a light-deflection embodiment of my invention operating upon a single mode of coherent light;

FIGS. 5 and 6 show modifications of the embodiment of FIG. 4 employing thin-film guides that are both curved and tapered.

DESCRIPTION OF ILLUSTRATIVE EMBODIMENT

Figure 3:
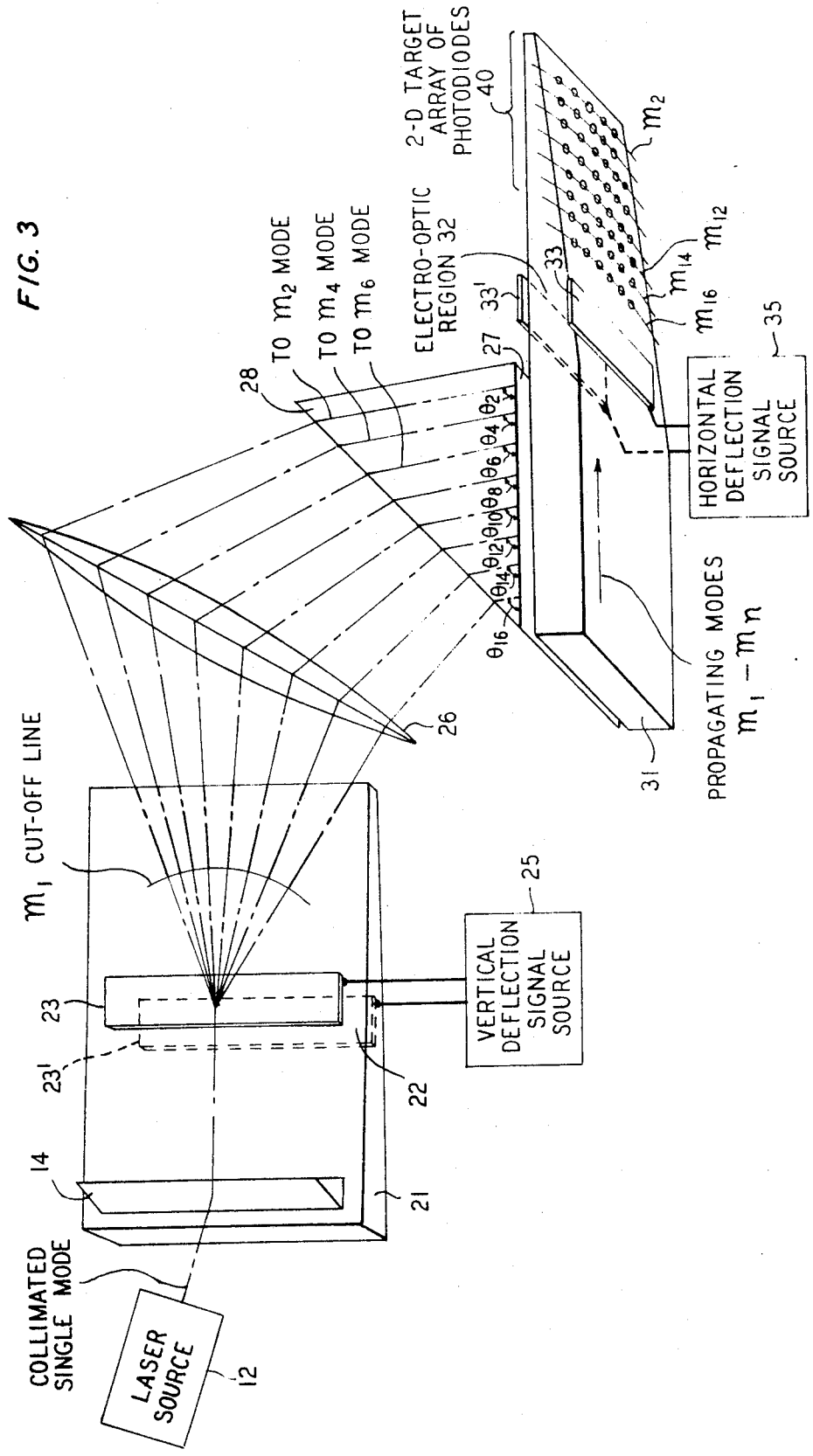
FIG. 3 is a partially pictorial and partially block diagrammatic illustration of a two-coordinate light-deflecting embodiment of my invention.

In the embodiment of FIG. 1 it is desired to transmit a coherent light beam in a plurality of modes $m_1$ and $m_n$ through the light guide 11 from a suitable laser source 12 to a utilization circuit 13. In the simplest kind of environment in which this might be required, the light guide 11 may be useful simply because the utilization circuit 13 may be part of an integrated apparatus or previously constructed apparatus and may be relatively inaccessible without the aid of the relatively thin light guide 11. Such circumstances might arise in the data processing and optical memory portions of a telephone central office. In an entirely different field, such as medical applications of laser light, the utilization circuit 13 may be an internal organ to be illuminated within a human body; and the use of a plurality of different modes may be desired in order to provide a particular lateral distribution of the coherent light energy. For example, the light guide can be bent into an arc so that radiations from a large number of modes provide a matrix of light spots.

For purposes of illustration, the light will be coupled out of guide 11 according to the technique of my present invention; but can be coupled into that guide 11 with greater angular selectivity by the technique disclosed in my above-cited copending patent application. For this reason, the input coupling to the guide 11 from laser source 12 is provided by a prism 14 possessed of a higher refractive index than guide 11 and separated from the top major surface of guide 11 by a suitable gap 15 of the order of a wavelength. The gap 15 has a lower index of refraction than either guide 11 or prism 14.

With this input coupling technique, the plurality of propagating modes $m_1$ through $m_n$ in guide 11 are excited or launched therein by directing light from laser source 12 throughout a suitable range of input angles such as $\theta_1$. In the simplest case this can be accomplished by employing a diverging cylindrical lens within laser source 12 to provide suitable divergence of the laser beam at the gap 15.

The material of the light guide 11 may illustratively be ZnO having an index of refraction $n_1$ of approximately 2.000. Its initial thickness is illustratively 4.00 microns and its smallest thickness at the portion nearest utilization circuit 13 may illustratively be 0.30 microns. The gaseous dielectric surrounding guide 11 is illustratively dry air having an index of refraction $n_2$ of approximately unity. The prism 14 is a rutile (titanium dioxide, $TiO_3$) prism having an index of refraction $n_3$ (ordinary ray) of approximately 2.586. The laser source 12 is illustratively a pulsed ruby laser operating at 694.3 nanometers; but it could also be a wide variety of other pulsed or continuous-wave lasers, such as a 632.8 nanometer helium-neon laser. The angles $\theta_1$ through $\theta_{20}$, for 20 different propagating transverse electric modes, illustratively range from 39° 30′ (or 0.690 radians) to 62° 24′ (or 1.089 radians), as set out in table I below. Also set out therein are the thicknesses of the tapered guide $W_1$ through $W_{20}$, at which, the modes become cut off, illustratively from 0.183 to 3.66 microns:

TABLE I

| Order of Modes $m$ | $\theta_m$ In Radians | Thickness of the guide at which the mode becomes cut off, $W_m$, in microns |
| --- | --- | --- |

| | | |
|---|---|---|
| 1 | 0.690 | 0.183 |
| 2 | 0.696 | 0.336 |
| 3 | 0.702 | 0.550 |
| 4 | 0.708 | 0.733 |
| 5 | 0.719 | 0.915 |
| 6 | 0.733 | 1.10 |
| 7 | 0.744 | 1.28 |
| 8 | 0.760 | 1.46 |
| 9 | 0.777 | 1.65 |
| 10 | 0.795 | 1.83 |
| 11 | 0.815 | 2.02 |
| 12 | 0.838 | 2.20 |
| 13 | 0.861 | 2.38 |
| 14 | 0.888 | 2.57 |
| 15 | 0.910 | 2.75 |
| 16 | 0.943 | 2.94 |
| 17 | 0.978 | 3.11 |
| 18 | 1.013 | 3.30 |
| 19 | 1.054 | 3.48 |
| 20 | 1.089 | 3.66 |

The operation of the embodiment of FIG. 1 may be more readily understood from a consideration of the following analysis. The modes of light propagating in a thin film of optical body such as guide 11 can be computed from the following general equation:

$$b_1 W - \phi_{1,0} - \phi_{1,2} = m\pi, \quad (1)$$

where $m$ is the order of the modes, subscripts 0, 1, 2 denote substrate (in this case the air below guide 11), the guide 11, and the gap 15, respectively; W is the magnitude of the varying small dimension (thickness) of guide 11;

$$b_1 = kn_1 \sin \theta, \quad (2)$$
$$k = \omega/c \quad (3)$$

$c$ is the velocity of light in vacuum, $\omega$ is the angular frequency of the laser and, $n_1$ the refractive index within the guide. Light waves within the guide may be analyzed as two plane waves propagating respectively along the directions making angles $\theta$ and $-\theta$ with respect to the surface of the guide 11. $\phi_{1,0}$ is half of the phase angle between the light incident at the lower guide surface (from the inside of the guide 11) and the reflected light from the same surface. $\phi_{1,2}$ is the similar angle at the upper surface of the guide 11. Basically this equation matches the wave amplitude at the boundaries between the media so that the intensity distribution $b_1 W$ of the waves inside the guide 11 is obtained. The intensity of the wave inside the guide exhibits sharp maxima at a finite number of discrete values of a relative propagation constant, $\beta$, which is related to $b_1$ by the formula $b_1^2 = (kn_1)^2 - \beta^2$. A more extensive analysis of equations of this type may be found in my article, with others, "Modes of Propagating Light Wave in Thin Deposited Semiconductor Films," published in the Vol. 14, No. 9 of the Applied Physics Letters at p. 292.

A careful study of equation (1) shows the following cutoff properties:

a. For $m=0$ (the dominant mode), and for the symmetrical guide 11 of FIG. 1 for which $n_0=n_2$, the mode always exists even though W, the thickness of the film, is vanishingly small.

b. For $m=0$, but for $n_0 \ne n_2$, the nonsymmetrical case disclosed in my above-cited copending patent application, Cthere is a minimum value of the thickness W for which the mode exists. This minimum thickness is called the cutoff thickness.

c. For $m \ne 0$ (any higher order mode), there is always a minimum value of W for which the mode exists. Such a mode, when launched into guide 11 at prism 15, will propagate to the right therein so long as W remains greater than the minimum value for which the mode exists. When the propagating light in that mode, for example, an even mode $m_1$, reaches a region of thickness of guide 11 where W is less than that minimum thickness, then that light in that mode must emerge from guide 11 approximately at a grazing angle to the surface from which it emerges, still propagating in the direction of utilization circuit 13. Mathematically, in the region where W is less than the cutoff thickness described above, $\Phi_{10}$ or $\Phi_{12}$ in the equation (1) becomes imaginary and the solutions of the discrete modes of propagation cannot be found in this equation. The light wave is then no longer confined in the guide. Instead, it emerges Cfrom the guide in the form of "continuous radiative mOdes." By a mathematical method known as the method of stationary phase (J. Mathews and R. L. Walker, "Mathematical Methods of Physis," W. A. Benjamin, 1965, pp. 85–86), the far-field pattern of the radiation emerging from the guide 11 can be calculated. It is found that the radiation is sharply directed at the grazing angle if the taper of the guide 11 is slow and linear. The radiation will coveR a range of angles broadly near the grazing angle if the taper of the guide is abrupt. If one has selected the angle $\Phi_1$ properly for a particular use environment, this emergence will occur at a point at which confinement or guiding of the optical radiation is no longer needed in order to insure that it reaches utilization circuit 13.

To calculate the cutoff thickness or the minimum thickness of a particular mode, in, as described above, we again use the equation (1). At the cutoff, $\Phi_{12}=0$ if $n_2>n_0$ or $\Phi_{10}=0$ if $n_0>n_2$; $\beta=ku_2$ if $n_2>n_0$ or $\beta=kn_0$ if $n_0>n_2$ and therefore, $b_1=k\sqrt{n_1^2-n_2^2}$ if $n_2>n_0$, or $b_1=k\sqrt{n_1^2-n_0^2}$ if $n_0>n_2$. Substituting the above values into the equation (1), were find $$W_m \text{ (cut-off)} = \frac{m\pi + \Phi_{10}}{k\sqrt{n_1^2 - n_2^2}} \text{ if } n_1 > n_2 > n_0$$
$$= \frac{m\pi + \Phi_{12}}{k\sqrt{n_1^2 - n_2^2}} \text{ if } n_1 > n_0 > n_2 \quad (4)$$

The calculation is particularly simple, in a symmetrical guide, since at cutoff, in the symmetrical guide, $n_0=n_2$, and $\Phi_{10}=\Phi_{12}=0$. For example, if $n_1=2.0$, $n_0=n_2=1.0$, the values of $W_m$ for modes $m=1$ to $m=20$ have been tabulated in table I. Since the cutoff thicknesses of different modes are different, a mode, $m_2$, of order different from mode $m_1$ will, in general, emerge from guide 11 at a different point somewhere along another line which I will call the $m_2$ cutoff line. It will be noted that the property of cutoff for each mode exists along a line of constant thickness, the cutoff line for that mode; and cutoff for different modes occurs at different thicknesses in a one-to-one relationship. A cutoff line is a locus of all points on a major surface of guide 11 for which the thickness W is constant at the cutoff value for a particular mode.

It follows from the preceding discussion that for the purposes of the present invention, in which there is a symmetrical guide 11, that is, a guide 11 having bounding media of like index beyond each major surface, it is not desirable to launch the lowest order mode which can propagate in guide 11. But it will be desirable to launch one or more higher order modes which will emerge from guide 11 at a desired cutoff line or lines.

It will also be noted that since the guide 11 is smoothly tapered, preferably, with a linear taper, from a low-loss optical material, that most of the energy must emerge near the cutoff line. The smooth taper prevents reflection of a propagating mode in the opposite direction of propagation; and the lack of optical losses in general prevents the absorption of the light at or near the cutoff point.

It will be also be noted that the propagation of the different modes has been depicted in the drawing of FIG. 1 as involving a multiple-bounce manner of propagation. This illustrative description of the light propagation is conventionally used to described the propagation of guided waves, whether guides by dielectric discontinuities or by metallic guides. Nevertheless, it should be appreciated that the guiding by the dielectric discontinuities employed in FIG. 1 is substantially different from that of metallic guides in that a portion of the optical energy always travels in the bounding medium, in this case, air. Nevertheless, the cutoff properties of the guide occur at quite sharply defined lines and the emerging beam, propagating at the grazing angle, will have a majority of its energy within a thickness comparable to the thickness W of the guide at the cutoff line. Each emerging beam is relatively highly collimated, as is desirable in the typical utilization circuit or apparatus 13 described above.

For a symmetrical guide, light emerges at the cutoff line, from both the upper and the lower surfaces of the guide (FIG. 1). Since the guide is very thin, the utilization circuit or apparatus 13, receives the light emerging from the both surfaces. In order that the light from the upper and that from the lower surface do not cancel, modes of even orders should be used. The utilization circuit or apparatus then sees essentially a plane wave emerging at a grazing angle from the major surfaces of the guide.

For a nonsymmetric guide, light emerges at the cutoff line from the upper surface only if $n_2 > n_0$ or from the lower surface only if $n_0 > n_2$. In this case even the lowest order or dominant mode $m=0$ can be used.

Figure 4:
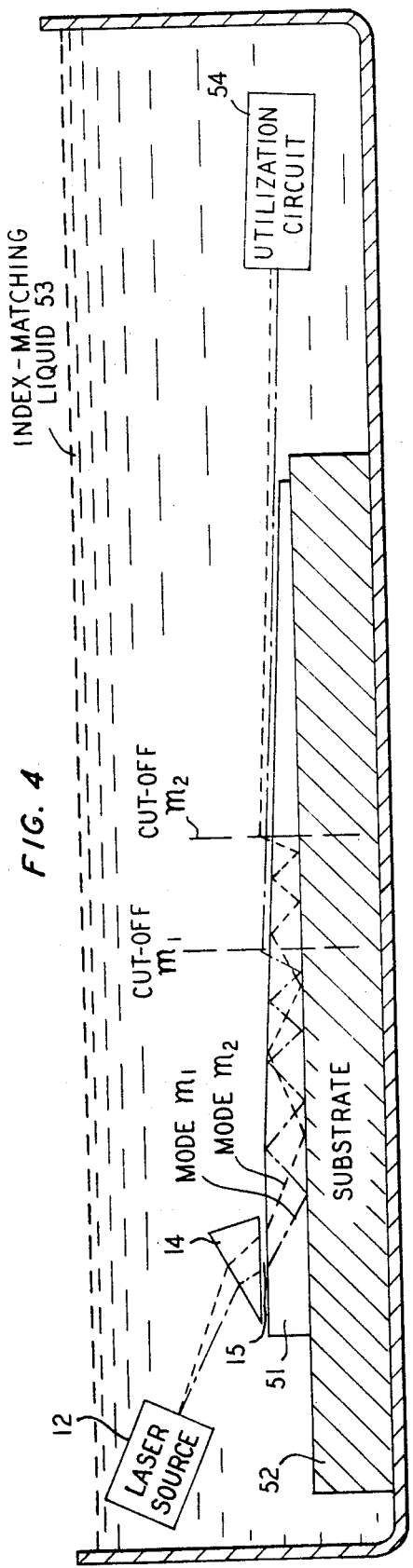
FIG. 4 shows a modification of the embodiment of FIG. 1 employing a solid substrate and an index-matching liquid.

FIG. 4 shows a nonsymmetrical guide. It is, of course, apparent in FIG. 4 that a nonsymmetrical guide, namely, a thin optical film 51 of refractive index, $n_1$, can be deposited on a solid substrate 52 of refractive index, $n_0$. In order that the light emerge from the upper surface only to avoid undue loss in the substrate, the film-substrate assembly is emerged in an index-matching liquid 53 which has a refractive index $n_2 > n_0$. For example, the film may be ZnO of $n_1' = 2.0$, the substrate may be microscopic glass slide of $n_0 = 1.50$ and the index-matching liquid may be 0-Toluidine providing a refractive index $n_2 = 1.57$. In this case, modes of both odd and even orders can be used, since the light emerges from one surface only.

In some cases, the index-matching liquid may not be necessary. It may be desirable for certain applications to compel the various modes to emerge into the substrate at the grazing angle and to dispose suitable optical detectors at those points or lines of emergence. For this purpose, the substrate would have a higher index of refraction than the liquid.

It can also be shown that it is possible to couple a light beam into a film or light guide 11 by properly tapering the guide so that its thickness at certain positions is equal to a minimum or cutoff value of thickness. A light beam from source 12 repositioned so that the beam is propagating at a grazing angle in a direction of increasing thickness could be launched into the guide through a major surface at the cutoff line. To provide both grazing-angle input coupling and grazing-angle output coupling for the same guide, a double-tapered guide may be used, for example, to provide input coupling at cutoff lines which are the mirror images of the illustrated cutoff lines. Such a technique for launching of the beam would, in general, not be preferred because the laser beam would need to be very thin in a direction normal to the guide and Would also need to be positioned carefully so that it is propagating in the right direction at the cutoff line exactly at the grazing angle to the surface.

The outstanding advantage of the output-coupling technique described in FIG. 1 is that it is much less cumbersome than previous techniques in certain integrated light-processing systems and in restricted spaces such as pertain to the medical applications. These advantages are also particularly noteworthy when the nature of the apparatus makes a controllable, nonmechanical change in the output-coupling position desirable. Such a modified embodiment, providing internal light beam deflection, is illustrated in FIG. 2.

In FIG. 2 laser source may be similar to source 12 of FIG. 1, except that a collimated single-mode light beam output is illustratively preferred. In order to illustrate the change in output-coupling position of the light beam propagating in the guide 21, a perspective top view is employed. Guide 21 differs from guide 11 of FIG. 1 in that a portion thereof is made of electro-optic material. This portion is designated the electro-optic region 22 and is that portion directly between the deflection electrodes 23 and 23'. The region 22 may consist of two triangular portions of electro-optic material, as disclosed in U.S. Pat. No. 3,447,855 to J. G. Skinner, issued June 3, 1969, both of said portions being thin films in this instance. AlternativelyH the region 22 may carry an acoustic wave propagating in the plane of the guide. As is well known in the art of light beam deflection by an acoustic wave, the light wave will be deflected by an angle which increases with the frequency of the acoustic wave. In any event, the deflection provided in region 22 is a deflection in a coordinate along the large transverse dimension of guide 21, essentially a linear or single-coordinate deflection.

This type of light deflection is particularly useful when the target of the deflected beam has a linear array of target elements. For instance, the target 24 could be the edge of an integrated circuit wafer to which it is desired to bond leads from an external circuit.

When the electro-optic effect is used for deflection of the light beam, a suitable deflection voltage is applied between electrodes 23 and 23' by a deflection signal source 25. Typically, for the application envisioned, the deflection voltage would be stepped from one discrete value to another to provide discrete separation of the positions of the deflected light beam. In any event, when the deflected light beam reaches the cutoff line for the mode $m_1$ in which it was propagating in guide 21, it emerges through a major surface of guide 21 at a grazing angle with respect to the ₌urface and continues propagating toward target 24 in the bounding medium, which is air in this case. With respect to the cutoff line, the beam propagates at an angle dependent on the deflection signal. It will be noted that the position of the cutoff line is preferably a circular arc of radius such that the deflected propagating light approaches it at an angle of about 90°. degrees. It is then necessary to taper the guide 11 uniformly toward all the directions of deflection. Such a light guide can be fabricated by mechanical polishing or by vacuum deposition with suitable masks. Normally, however, the angles of deflection are so small, a guide tapered in one dimension may serve the purpose.

A modification of the embodiment of FIG. 2 to provide a two-coordinate light deflection arrangement usable for a more desirable two-dimensional target array is shown in FIG. 3. The laser source 12, prism 14, guide 21, region 22, electrodes 23 and 23' and signal source 25 remain the same as before. To that system is added the converging lens 26 which is tilted at an angle with respect to the paths of the light after emergence from guide 21, such that for each deflection position in guide 21 the different acute angle $\Phi_2$ through $\Phi_{16}$ in a monotonic sequence in a one-to-one correspondence to the preceding deflected beam positions is obtained at the coupling interface 27 of the coupling prism 28. Note that the subscript of $\Phi$ denotes the order of the mode. Modes of even orders are used here since the guide illustrated is symmetrical.

For convenience, I will call the deflection apparatus preceding lens 26 the vertical deflection apparatus, and the apparatus following lens 26 and preceding the two-dimensional target array of photodiodes 40, the horizontal deflection apparatus.

Thus, for each vertical deflection, a unique acute angle $\Phi$ at the coupling surface 27 of the horizontal deflection apparatus is obtained. The single mode light from laser source 12 incident upon surface 27 will be launched into a plurality of propagating modes illustratively $m_2$ through $m_{16}$ in the optical guide 31 in one-to-one correspondence with the values of the corresponding angles $\Phi$. In accordance with the teaching of the embodiment of FIG. 1, each of these different propagating modes will emerge at a different cutoff line unique to its particular mode $m$. Thus, the vertical deflection is preserved by a change in the cutoff line of guide 31 from time to time in direct correspondence to the deflection voltage supplied by source 25 of the preceding deflection stage.

To obtain the deflection in the other coordinate, which is now along the large lateral dimension of guide 31, an electro-optic deflection apparatus exactly like that of the preceding stage is employed. It includes the electro-optic region 32, the electrodes 33 and 33', and the deflection signal source 35 connected therebetween.

For a 10×10 two-dimensional target array of photodiodes 40 the following illustrative parameters pertain to the illustrative configuration of FIG. 3:

TABLE II

| Order of Mode m | Angle, $\theta_m$ (radians) | $\beta/kn_1$ of Mode m in Guide 31 |
|---|---|---|
| 2 | 0.696 | 0.993 |
| 4 | 0.708 | 0.982 |
| 6 | 0.733 | 0.963 |
| 8 | 0.760 | 0.938 |
| 10 | 0.795 | 0.906 |
| 12 | 0.838 | 0.866 |
| 14 | 0.888 | 0.819 |
| 16 | 0.943 | 0.760 |

It should be noted that $\Phi_m$ in the above table II is the angle between the light beam and the base of the prism 28 as shown in FIG. 3. Again, the guide 31 is ZnO of refractive index $n_1 = 2.00$. It is self-supported in air of refractive index $n_2 = n_0 = 1.00$. The light guide 31 has an initial thickness of 4.00 microns and tapered to almost nothing in the direction of light propagation.

Figure 5:
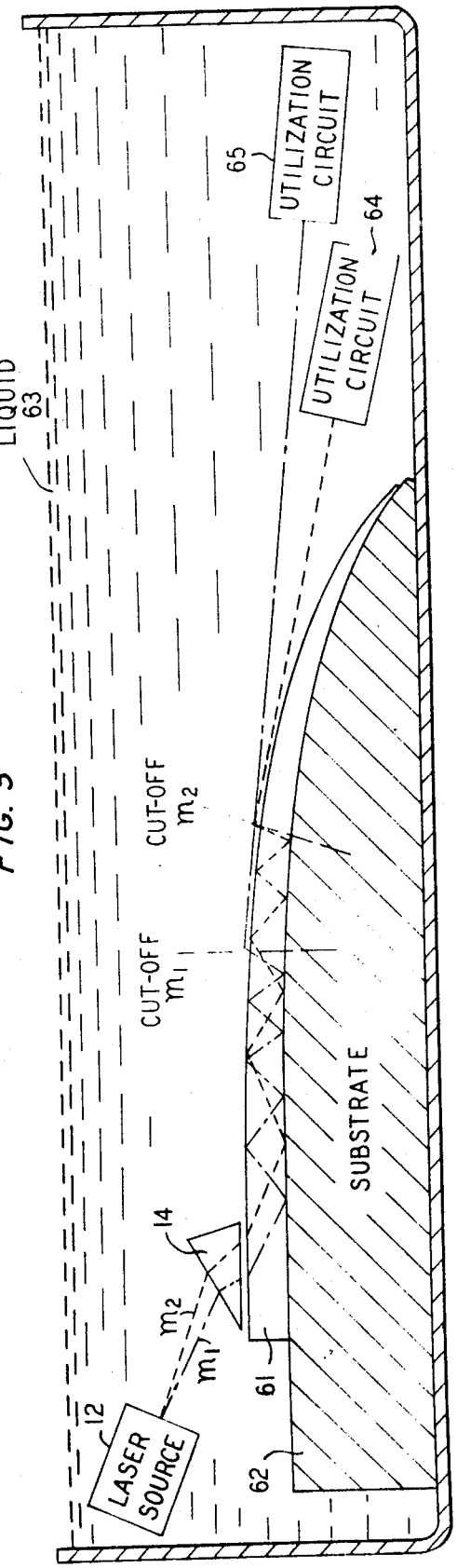

In FIG. 5, the embodiment of FIG. 4, described above as a modification of FIG. 1, is modified by curving the thin-film guide about an axis orthogonal to the plane of the paper. The substrate 62 is, of course, curved in the same way in order to support guide 61. The materials of the substrate 62, of the index-matching liquid 63 and of guide 61 are the same as in the embodiment of FIG. 4.

The advantage of the embodiment of FIG. 5 is that the modes of order $m_1$ and $m_2$ emerge at their respective cutoff lines on distinctly different tangents to the curved surface of emergence. Since their propagation directions are angularly separated, they are readily received by different utilization circuits 64 and 65.

In other respects, the operation of the embodiment of FIG. 5 is similar to that of FIG. 4.

It will be noted that guide 61 curves about substrate 62, since emergence of the beams into the liquid 63 is desired. If emergence of the beams from the guide into the substrate is desired, then the sense of curvature should be opposite, that is, the substrate should curve about the guide.

The modified embodiment of the latter type is shown in FIG. 6, in which substrate 72 curves about guide 71. Both of them curve about an axis above guide 71. Consequently, the modes of order $m_1$ and $m_2$ emerge as well-defined beams from guide 71 tangent to its interface with substrate 72 at different cutoff lines and, thus, at distinctly separated angles. The beams are refracted at surface 76 of substrate 72 to propagate toward the respective utilization circuits 64 and 65.

By illustrating the application of my invention to optical deflection apparatuses, I do not wish to imply that it is not useful in substantially different apparatuses in which guiding of light in at least one dimension is required. The principles of smooth tapers of dielectric materials to provide simplified output coupling which is discrete for different modes should be clear from the preceding disclosure. In addition, it should be clear that there are many instances and applications in which it will be desirable to couple a single-propagating mode into or out of an optical guiding apparatus or thin film in such a manner. It should also be clear, that it is possible to integrate many other optical devices other than the photodiodes 40 of FIG. 3 into such a thin-film light guide.

I claim:

1. An optical guiding apparatus for interposition in a path extending from a supplying apparatus to a receiving apparatus, said guiding apparatus being of the type including a dielectric body and at least one other dielectric material bounding said body and having a lower index of refraction than the index of refraction of said body, said body having two major faces separated by a distance proportioned for supporting and guiding of at least one mode of light through a first portion of said path therein, said apparatus being characterized by a taper of said body to vary said distance to a cutoff value at a cutoff line for said one mode of said light, said other dielectric material providing a second portion of said path and transmitting therethrough from said cutoff line substantially all of said one mode of said light.

2. An optical guiding apparatus of the type claimed in claim 1 defining a plurality of at least partially separate paths extending from the supplying apparatus to the receiving apparatus and including in said paths extending from the supplying apparatus means for launching in the dielectric body a plurality of propagating modes of a supplied light beam and in which a substantially linear taper of the body provides spaced cutoff lines for said modes in a one-to-one correspondence with said modes, said other dielectric material providing discrete second portions of said paths and transmitting therethrough from said cutoff lines substantially all of the respective modes of the light toward the receiving means.

3. An optical guiding apparatus of the type claimed in claim 1 in which the dielectric body includes an electro-optic region extending between the major faces of said body and intercepting a beam of light guided therein and said apparatus includes means for driving said electro-optic region controllably to deflect the light beam therein into any of a plurality of paths, and in which the taper of said body provides for said beam a cutoff line extending to each of its deflected paths, each of said deflected paths extending from said dielectric body to said receiving apparatus through the other dielectric material.

4. An optical guiding apparatus of the type claimed in claim 3 including in the paths extending to said receiving apparatus a second dielectric body, and at least another dielectric material bounding said second body and having a lower index of refraction than the index of refraction of said second body, said second body having a second electro-optic region therein and two major faces separated by a second distance proportioned for the guiding of light therein, means for launching said beam from any of a plurality of the deflected paths into said second dielectric body in one of a plurality of different propagating modes in a one-to-one correspondence with said deflected paths, and means for driving said second electro-optic region controllably to deflect the light beam therein in a sense parallel to the major faces of said second body, said second body being tapered to vary said second distance to respectively different cutoff values at respectively different cutoff lines for the plurality of different propagating modes, said different cutoff lines being separated along all the paths of the deflected light beam in said second body.

5. An optical guiding apparatus of the type claimed in claim 4 including a two-dimensional array of light-detecting elements disposed on one of the major faces of said second body through which faces the deflected light beam emerges, said elements being arranged in rows along the cutoff lines.

6. An optical guiding apparatus of the type claimed in claim 1 including in the path extending from the supplying apparatus means for launching in the dielectric body a plurality of propagating modes of the supplied light beam and in which a linear taper of the body provides spaced cutoff lines for said modes in a one-to-one correspondence with said modes, the dielectric body includes an electro-optic region, and the apparatus includes means for driving said electro-optic region controllably to deflect the light beam therein into a plurality of paths separated in a coordinate transverse to the coordinate in which said cutoff lines are spaced, said plurality of paths extending to said receiving apparatus.

7. An optical guiding apparatus of the type claimed in claim 6 in which the launching means includes means for controllably changing the modes launched into said body.

8. An optical guiding apparatus of the type claimed in claim 3 including in the paths extending to the receiving means a plurality of light-detecting elements disposed on a common major face of the dielectric body at a plurality of positions at which the light beam may emerge.

9. An optical guiding apparatus of the type claimed in claim 1 including in the path extending to the receiving means means integrally mounted on a major face of the dielectric body at a cutoff line for responding to the light beam at said cutoff line.

10. An optical guiding apparatus of the type claimed in claim 6 including as a part of the receiving means a plurality of photoresponsive means in a two-dimensional array in rows along cutoff lines for different modes on a common major face of the dielectric body.

11. An optical guiding apparatus of the type claimed in claim 1 in which the other dielectric material bounding said body includes a solid bounding one major face and a liquid bounding the other major face, the index of refraction of said liquid being selected to provide optically matched propagation of the light in the path extending from said body to said receiving means, and the index of refraction of said solid being less than said index of said liquid to provide that the propagating mode emerges into said liquid in preference to said solid.

12. An optical guiding apparatus of the type claimed in claim 1 in which the two major faces are curved while maintaining said taper in the direction of light propagation.

13. An optical guiding apparatus of the type claimed in claim 12 in which the bounding material includes a solid about which the faces are curved.

14. An optical guiding apparatus of the type claimed in claim 12 in which the bounding material includes a solid curved about the body tangent to one major face.

* * * * *